US008330869B2

(12) United States Patent
Murashita et al.

(10) Patent No.: US 8,330,869 B2

(45) Date of Patent: Dec. 11, 2012

(54) IMAGE PROCESSING PROGRAM, METHOD AND PROCESSOR FOR ADJUSTING LUMINANCE COMPONENT AND CHROMINANCE COMPONENT

(75) Inventors: Kimitaka Murashita, Kawasaki (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 926 days.

(21) Appl. No.: 12/139,796

(22) Filed: Jun. 16, 2008

(65) Prior Publication Data

US 2008/0246883 A1 Oct. 9, 2008

Related U.S. Application Data

(63) Continuation of application No. PCT/JP2005/023079, filed on Dec. 15, 2005.

(51) Int. Cl.
*H04N 5/21* (2006.01)

(52) U.S. Cl. ........ 348/630; 348/672; 348/362; 348/663; 345/600; 382/167; 382/169; 382/274; 382/275

(58) Field of Classification Search .................. 348/630; 345/600

See application file for complete search history.

(56) References Cited

U.S. PATENT DOCUMENTS 5,040,054 A * 8/1991 Schmidt et al. ............ 348/225.1
7,348,992 B2 3/2008 Kim et al.
7,394,932 B2 * 7/2008 Kida et al. .................... 382/169
2002/0171663 A1 * 11/2002 Kobayashi et al. ........... 345/600
2004/0017380 A1 1/2004 Kim et al.
2005/0280869 A1 * 12/2005 Kameyama .................. 358/3.01
2008/0111782 A1 * 5/2008 Shin et al. ....................... 345/99

FOREIGN PATENT DOCUMENTS

JP 3-201697 9/1991
JP 7-250339 9/1995
JP 07-250339 A * 9/1995

OTHER PUBLICATIONS

Partial English translation of JP 7-250339, published Sep. 26, 1995 (Ref. AH in the Information Disclosure Statement filed Jun. 16, 2008).

Japanese Office Action issued Feb. 8, 2011 in corresponding Japanese Office Action 2007-550056.

International Search Report (PCT/ISA/210) mailed Feb. 21, 2006 in connection with the International Application No. PCT/JP2005/023079.

Ed. Hideyuki Tamura "Computer Image Processing", Ohmsha, Dec. 20, 2002.

* cited by examiner

*Primary Examiner* — Jefferey Harold
*Assistant Examiner* — Sam Huang
(74) *Attorney, Agent, or Firm* — Staas & Halsey LLP

(57) ABSTRACT

A parameter for determining a chrominance correction curve for use in correcting the chrominance component of each pixel is determined from one or more parameters for determining a luminance correction curve for use in correcting luminance applied to the entirety of one frame of motion picture data. The chrominance component of each pixel is corrected using the chrominance correction curve.

15 Claims, 14 Drawing Sheets

SIMPLE LUMINANCE CORRECTION TO CONSTANTLY BRIGHTEN

LUMINANCE CORRECTION TO ENHANCE CONTRAST
(CORRECTION OF DYNAMIC RANGE)

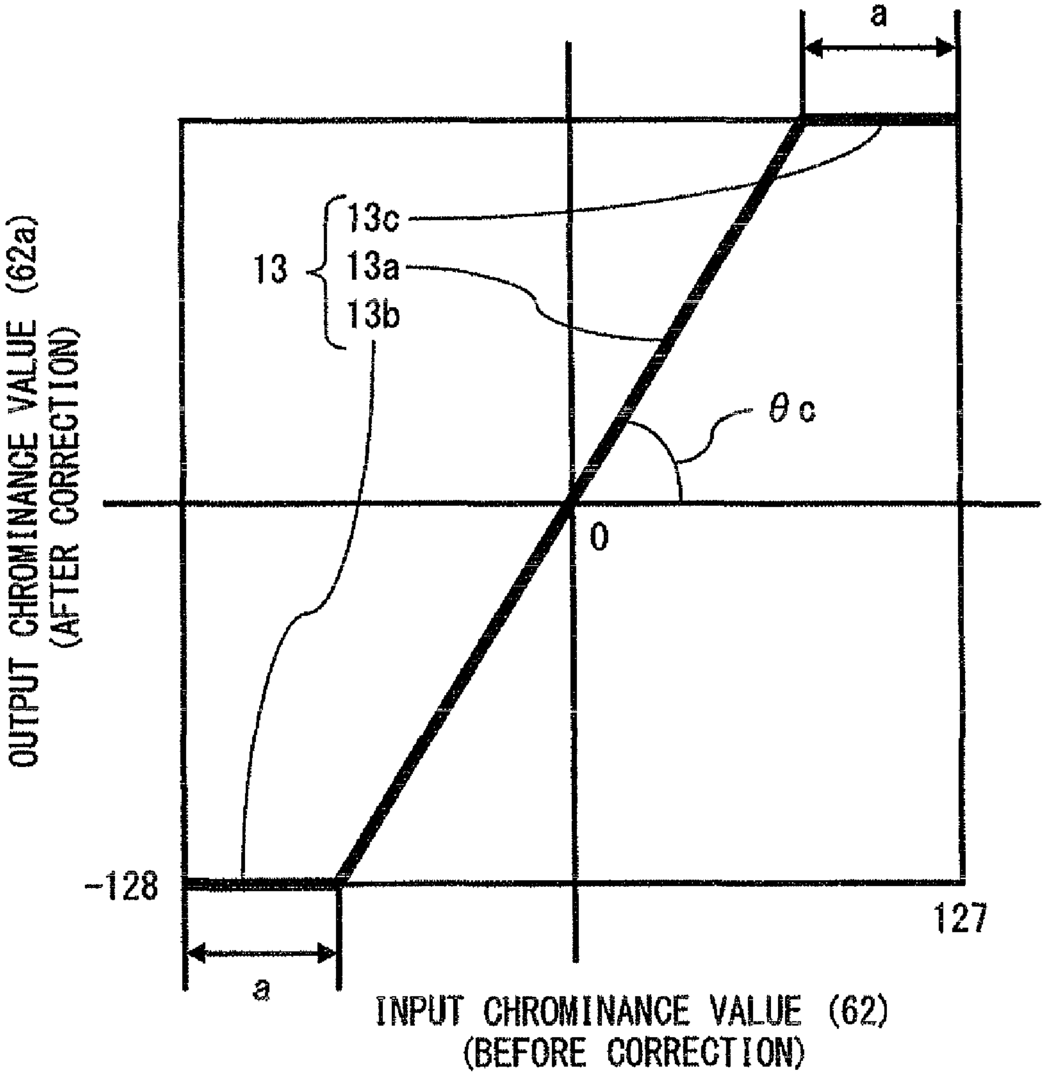
F I G. 2

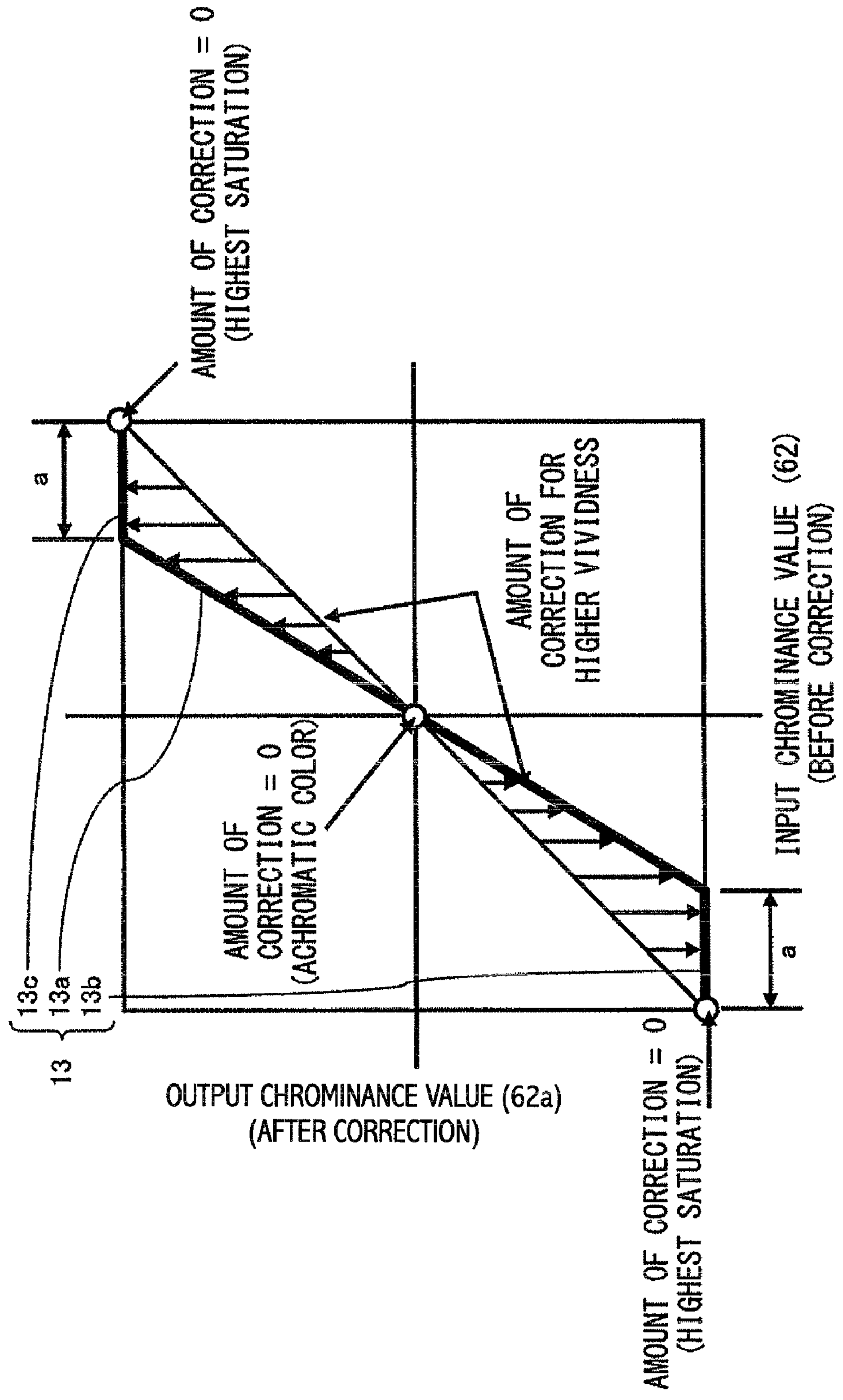
F I G. 4

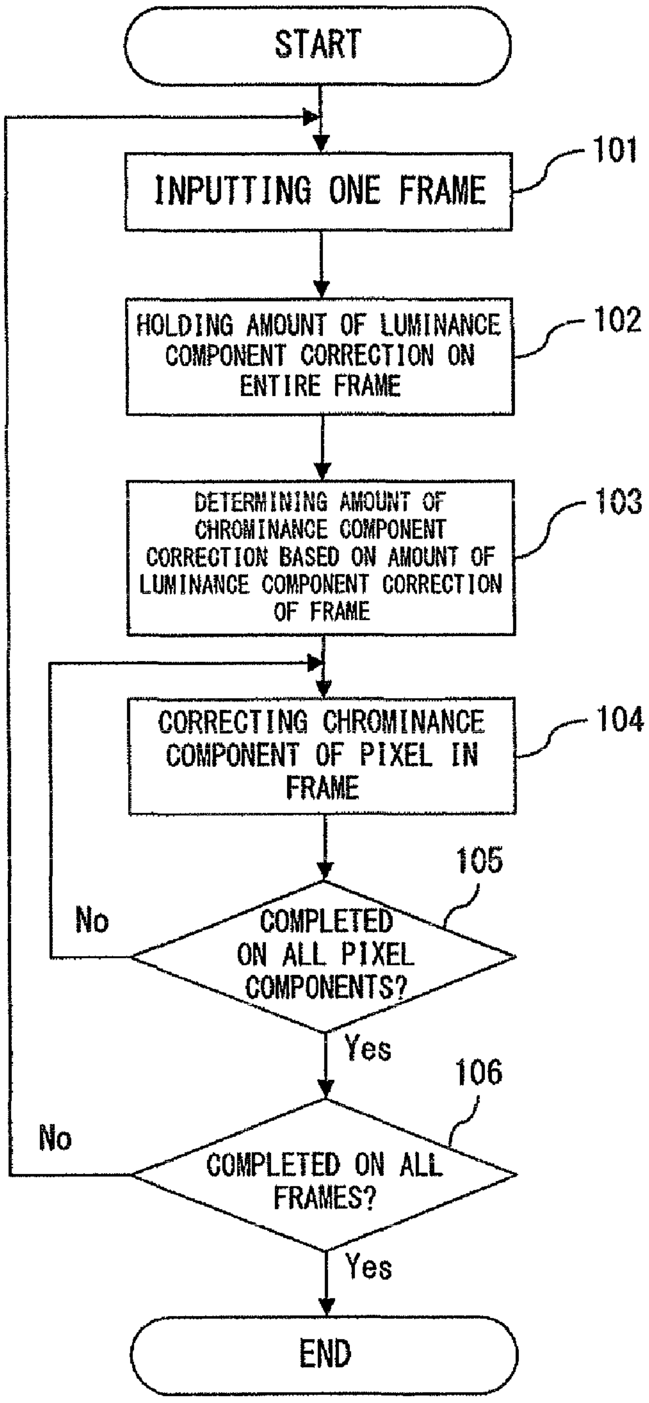
F I G. 5

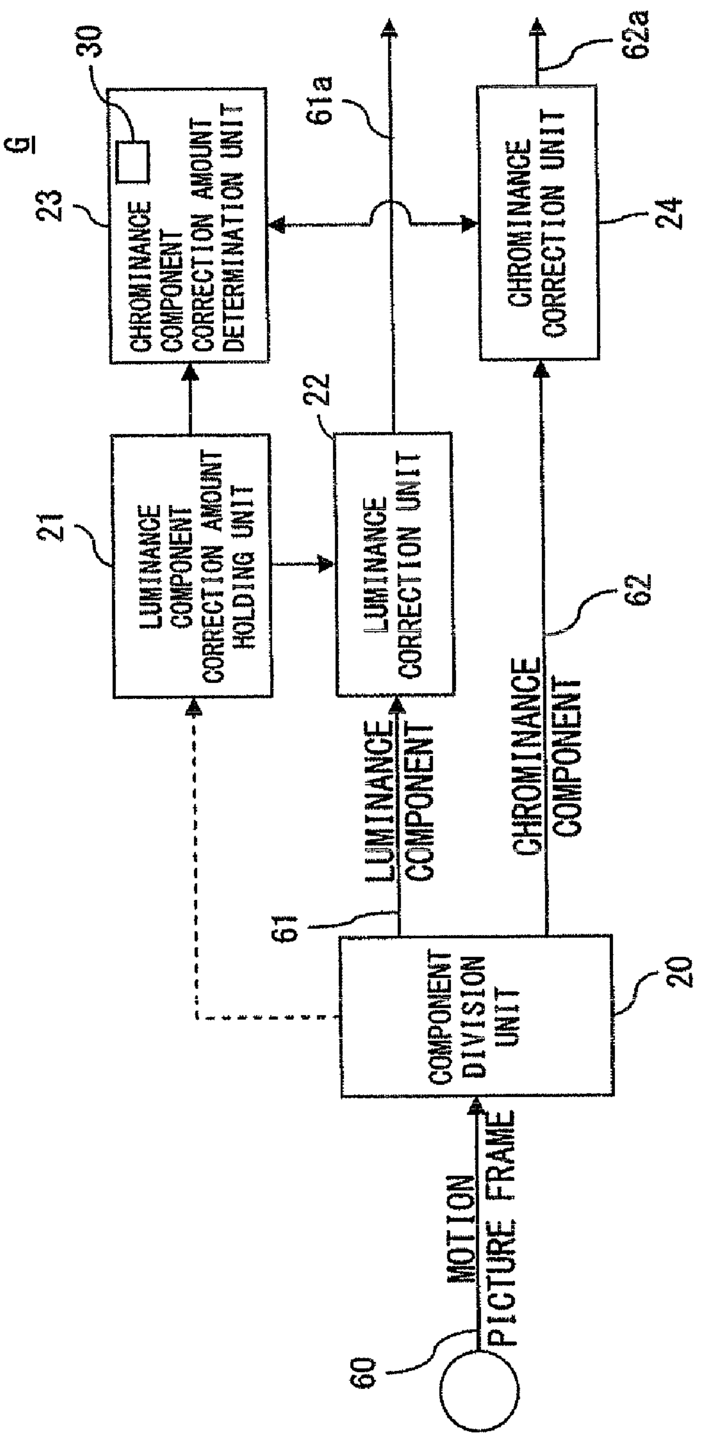
F I G. 6

30

31 32

| INTEGRATION VALUE | PARAMETER a |
|---|---|
| 0 | 0 |
| 1 | 1 |
| 2 | 1 |
| 3 | 1 |
| 4 | 1 |
| 5 | 2 |
| 6 | 2 |
| : | : |
| 16250 | 16 |
| 16251 | 16 |
| 16252 | 16 |
| 16253 | 16 |
| 16254 | 16 |
| 16255 | 16 |
| 16256 | 16 |
| 16257 | 16 |

F I G. 7

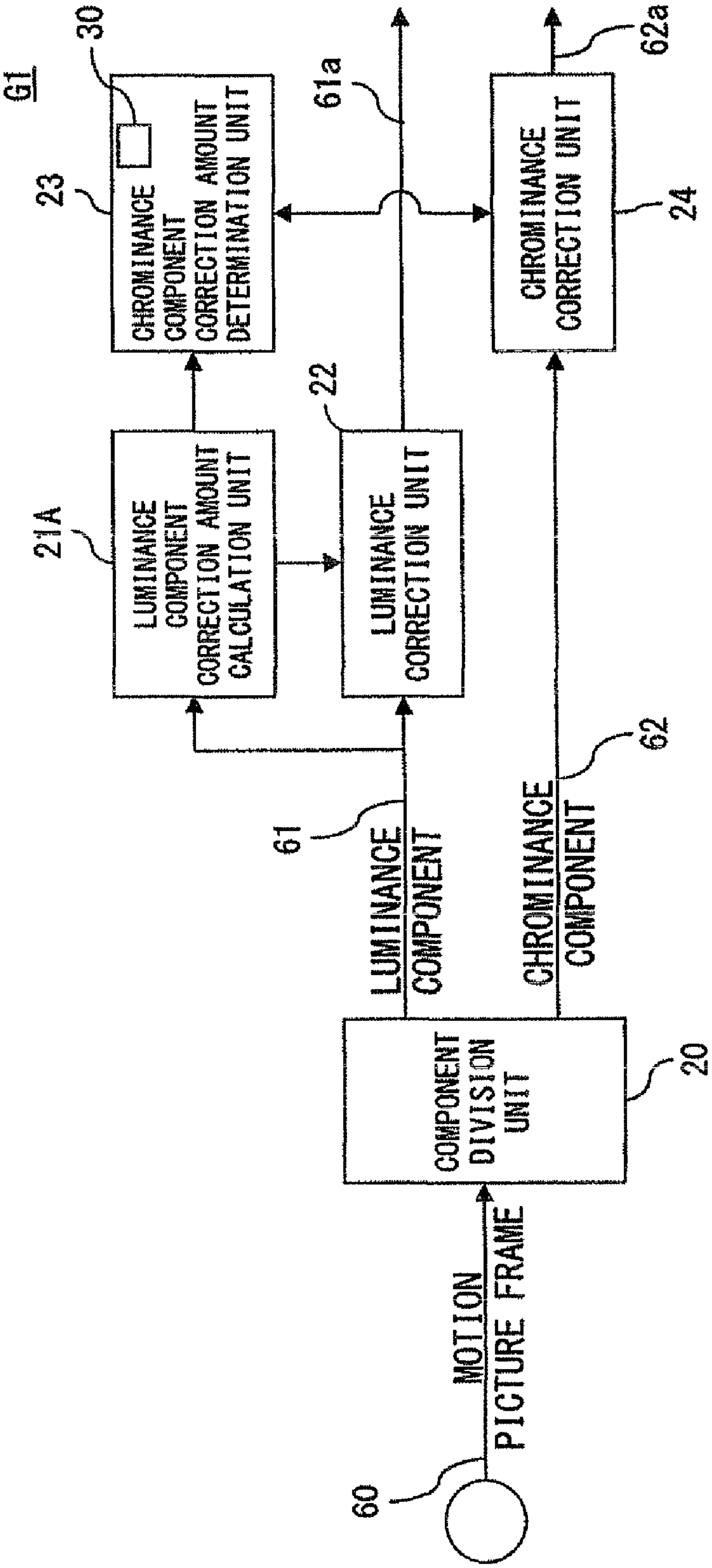
F I G . 8

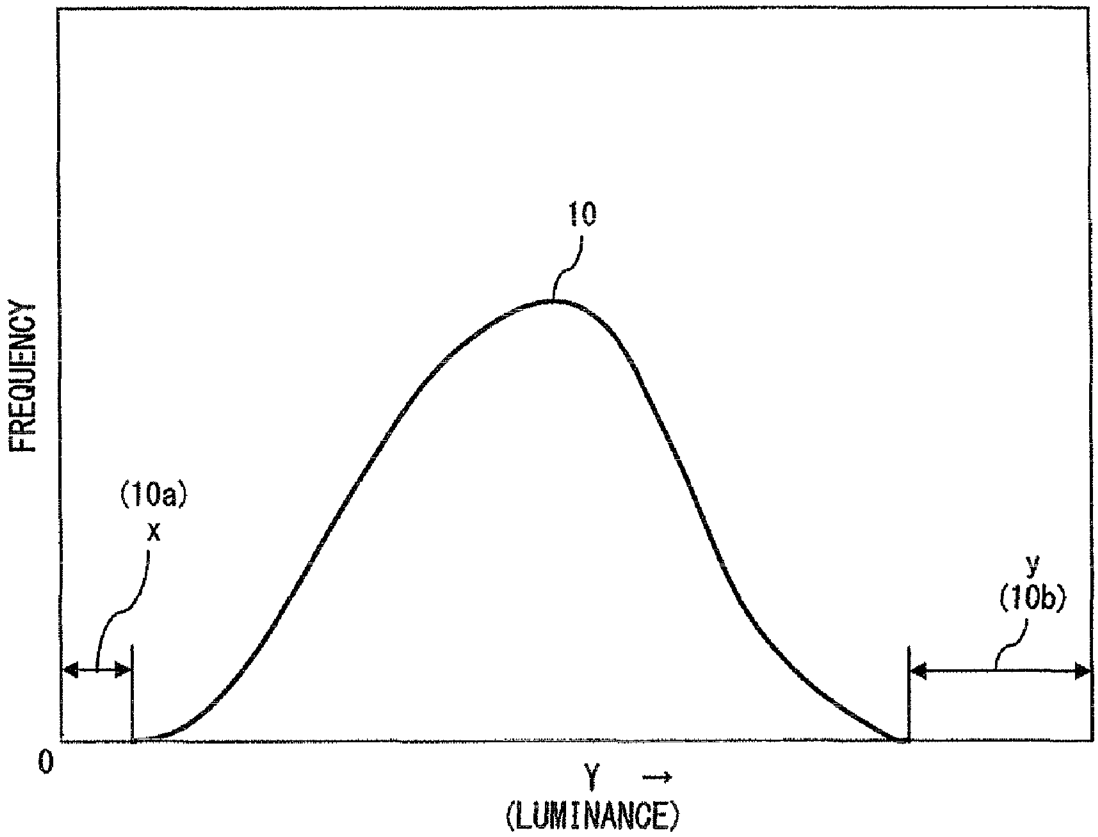
F I G. 9A

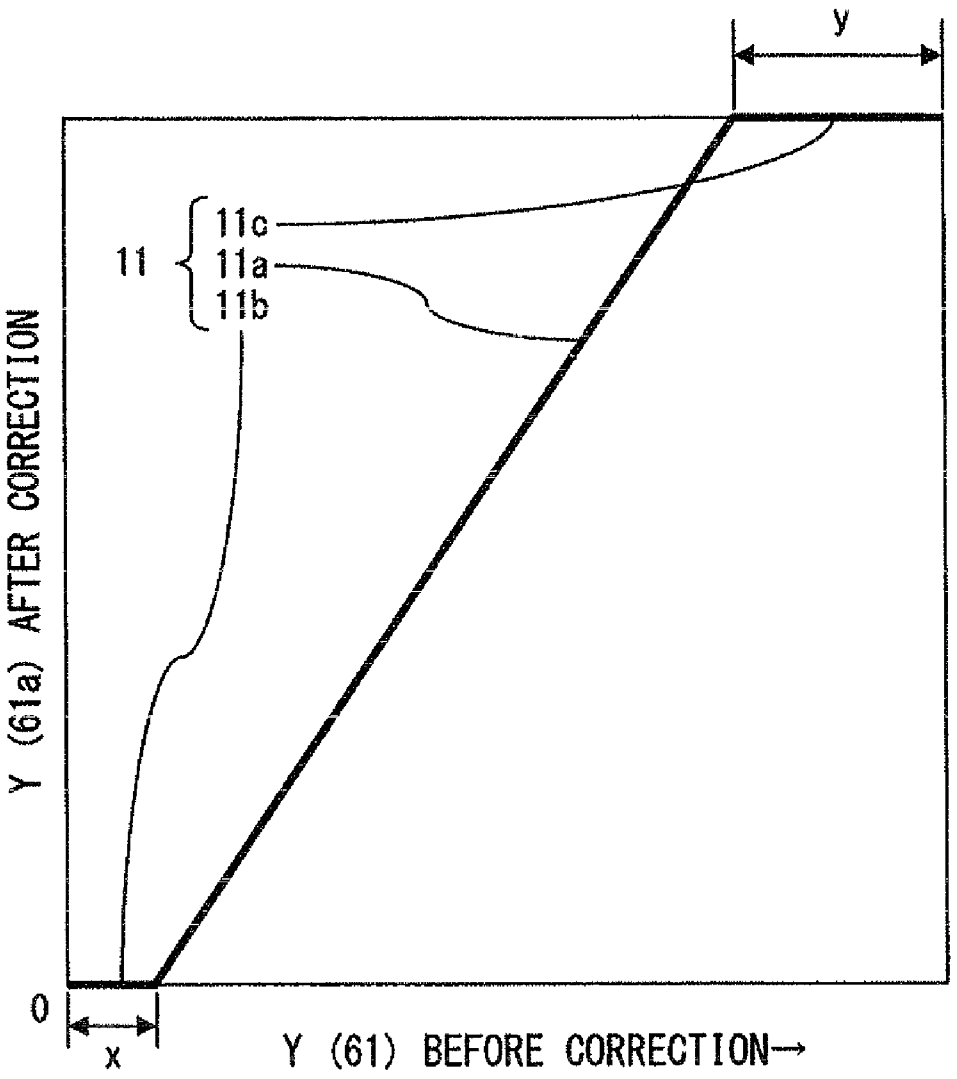
F I G. 9B

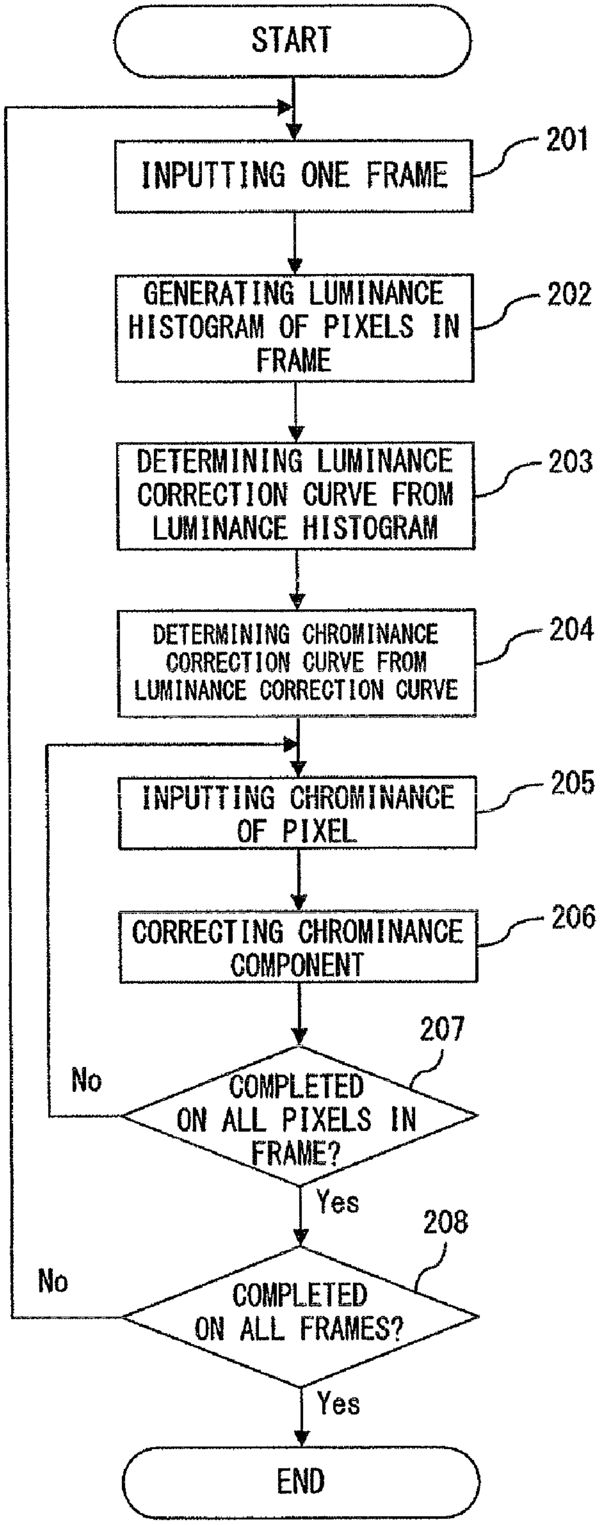
F I G. 10

IMAGE PROCESSING PROGRAM, METHOD AND PROCESSOR FOR ADJUSTING LUMINANCE COMPONENT AND CHROMINANCE COMPONENT

CROSS REFERENCE TO RELATED APPLICATION

This application is a continuation of PCT application of PCT/JP2005/023079, filed on Dec. 15, 2005, the entire contents of which are incorporated herein by reference.

BACKGROUND OF THE INVENTION

1. Field of the Invention

The present invention relates to an image processing program, an image processing method, and an image processor, and for example, to the effective technology of adjusting a luminance component and a chrominance component in a motion picture including the luminance component and the chrominance component.

2. Description of the Related Art

Image data includes plural pieces of component information. The image data can be represented by three types of color components (primary colors of light) such as RGB etc., but most motion pictures are represented by luminance components and chrominance components. For example, YCbCr and YUV signals are formed by one luminance component (Y) and two chrominance components (U/V, Cb/Cr). An image taken by a TV camera changes in brightness and/or hue depending on external environments such as lighting etc. If it is determined that the brightness and/or vividness of a camera input image are not appropriate, it is necessary to adjust and correct an input signal.

A method of correcting a motion picture can be "Color Correction System and Its Method" disclosed by the patent document 1. In this patent document 1, a color signal is divided into a brightness signal, a saturation signal, and a hue signal, and an amount of correction is calculated for each signal to correct each signal by the amount of correction.

There can be another conventional technology disclosed by the patent document 2 "Method and Device for Correcting Video Signal". In this patent document 2, a difference between the luminance signal before correction and the luminance signal after correction is detected on all pixels in an image, and the amount of correction of the chrominance component of each pixel is determined to be a value depending on a difference value (amount of change in Y).

In the above-mentioned technology of the patent document 1, the amount of correction of each component is individually obtained from the respective components configuring a motion picture, and each component is corrected by each corresponding amount of correction. However, in this system, an image may not be appropriately corrected. In the technology of the patent document 1, for example, when an image is analyzed on luminance components and chrominance components individually, and if the analysis results in that "the luminance component is somewhat low, it is to be enhanced", and that "the chrominance component provides sufficient saturation, and no correction is required for the chrominance component", then the luminance component is corrected but the chrominance component is not corrected. When the luminance component is corrected, the balance between the luminance component and the chrominance component cannot be appropriately maintained in a corrected image, and the chrominance component that provides sufficient saturation before the correction provides insufficient saturation after the correction of the luminance component. To solve the technological problem, it is necessary to determine the presence/absence of the correction of the chrominance component depending on not only the chrominance component before correction, but also the correction of the luminance component.

Since the technology of the patent document 2 determines the amount of correction of the chrominance component depending on the amount of change of the luminance component, the above-mentioned technological problem of the patent document 1 does no occur.

However, in the technology of the patent document 2, there are two following technological problems.

First, since the amount of change of the luminance component is calculated for all pixels and the amount of correction of the chrominance component is determined for all pixels, the amount of processing is very large, and dedicated hardware is required for real time operation.

Second, the technology is effective in simple luminance correction to enhance (i.e., increase) the luminance as shown in FIG. 1A as described later, but in the luminance correction for enhancing the contrast (in other words, clarity) of an image as shown in FIG. 1B as described later, there is a technological problem. That is, in the latter luminance correction, there are an area (i.e., an area of high luminance) corrected for higher luminance, an area (i.e., an area of intermediate luminance) without any change in luminance, and an area (i.e., an area of low luminance) corrected for lower luminance in a corrected image in a mixed state. Therefore, there are an area of enhanced saturation and an area of reduced saturation in a mixed manner, thereby generating an unnatural image.

Patent Document 1: Japanese Published Patent Application No. 2004-64792

Patent Document 2: Japanese Published Patent Application No. H3-201697

SUMMARY OF THE INVENTION

The present invention aims at providing a technique of realizing the improvement of image quality by the chrominance correction depending on the luminance correction with a small processing load and without requiring any dedicated hardware etc.

Another objective of the present invention is to provide a technique of realizing the chrominance correction depending on the luminance correction without generating an unnatural image.

In the first aspect of the present invention, a computer-readable storage medium storing an image processing program used to direct a computer to perform image processing is provided. The image processing includes:

a first step of determining an amount of luminance component correction value to be applied to an entirety of a frame forming a motion picture on the basis of respective luminance components of a plurality of pixels in the frame or in another precedent frame;

a second step of determining an amount of chrominance component correction value to be applied to respective chrominance components of all pixels in the frame from the amount of luminance component correction value; and a third step of correcting respective luminance components of the all pixels in the frame by the amount of luminance component correction value determined in the first step, and correcting the respective chrominance components of the all pixels in the frame by the amount of chrominance component correction value determined in the second step.

In the second aspect of the present invention based on the computer-readable storage medium according to the first aspect, in the second step, the amount of chrominance component correction value is determined by reading the amount of chrominance component correction value corresponding to the amount of luminance component correction value from a storage unit where the amount of luminance component correction value and the amount of chrominance component correction value are stored and associated with each other.

In the third aspect of the present invention based on the computer-readable storage medium according to the first aspect, in the first step, the amount of luminance component correction value is determined to be an externally set amount or an accompanying amount received together with the frame.

In the fourth aspect of the present invention based on the computer-readable storage medium according to the first aspect, in the first step, one or more luminance components included in each of a plurality of frames configuring the motion picture are analyzed to determine the amount of luminance component correction value.

In the fifth aspect of the present invention, an image processing method is provided. The image processing method includes:

a first step of determining an amount of luminance component correction value to be applied to an entirety of a frame forming a motion picture on the basis of respective luminance components of a plurality of pixels in the frame or in another precedent frame;

a second step of determining an amount of chrominance component correction value to be applied to respective chrominance components of all pixels in the frame from the amount of luminance component correction value; and a third step of correcting respective luminance components of the all pixels in the frame by the amount of luminance component correction value determined in the first step, and correcting the respective chrominance components of the all pixels in the frame by the amount of chrominance component correction value determined in the second step.

In the sixth aspect of the present invention based on the image processing method according to the fifth aspect, the amount of luminance component correction value includes one or more first parameters for defining a luminance correction curve for uniquely defining a luminance value after correction for a luminance value before correction.

In the seventh aspect of the present invention based on the image processing method according to the fifth aspect, the amount of chrominance component correction value applied to the respective chrominance components of the frame includes one or more second parameters for defining a chrominance correction curve for uniquely defining a chrominance value after correction for a chrominance value before correction.

In the eighth aspect according to the present invention based on the image processing method according to the fifth aspect, the amount of luminance component correction value includes one or more first parameters for defining a luminance correction curve for uniquely defining a luminance value after correction for a luminance value before correction;

the amount of chrominance component correction value applied to the respective chrominance components of the frame includes one or more second parameters for defining a chrominance correction curve for uniquely defining a chrominance value after correction for a chrominance value before correction; and the one or more second parameters are determined from the one or more first parameters.

In the ninth aspect according to the present invention based on the image processing method according to the fifth aspect, the amount of luminance component correction value is a slope value of a luminance correction curve for uniquely defining a luminance value after correction for a luminance value before correction.

In the tenth aspect according to the present invention based on the image processing method according to the fifth aspect, the amount of chrominance component correction value is a gradient value of a chrominance correction curve for uniquely defining a chrominance value after correction for a chrominance value before correction.

In the eleventh aspect according to the present invention based on the image processing method according to the fifth aspect, the amount of luminance component correction value includes one or more first parameters for defining a luminance correction curve for uniquely defining a luminance value after correction for a luminance value before correction;

the amount of chrominance component correction value applied to the respective chrominance components of the frame includes one or more second parameters for defining a chrominance correction curve for uniquely defining a chrominance value after correction for a chrominance value before correction;

one of the one or more first parameters is an accumulation value of a difference between the luminance correction curve and another luminance correction curve indicating a case where luminance correction is not performed; and at least one of the one or more second parameters of the chrominance correction curve is determined depending on the accumulation value.

In the twelfth aspect of the present invention, an image processor is provided. The image processor includes:

a component division unit for dividing each frame of a motion picture into a luminance component and a chrominance component;

a luminance component correction value amount determination unit for determining an amount of luminance component correction value to be applied to each of all pixels in a frame currently concerned for correcting the luminance component on the basis of respective luminance components of a plurality of pixels in the frame or in another precedent frame;

a luminance component correction unit for correcting the luminance component of each of the all pixels in the frame divided by the component division unit by the amount of luminance component correction value determined by the luminance component correction value amount determination unit;

a chrominance component correction value amount determination unit for determining an amount of chrominance component correction value to be applied to each of the all pixels in the frame for correcting the chrominance component from the amount of luminance component correction value determined by the luminance component correction value amount determination unit; and a chrominance component correction unit for correcting the chrominance component of each of the all pixels in the frame divided by the component division unit by the amount of chrominance component correction value determined by the chrominance component correction value amount determination unit.

In the thirteenth aspect according to the present invention based on the image processor according to the twelfth aspect, the chrominance component correction value amount determination unit includes a storage unit where the amount of luminance component correction value and the amount of chrominance component correction value are stored and associated with each other; and the chrominance component correction unit corrects the chrominance component of each of the all pixels configuring the frame using the amount of chrominance component correction value read by the chrominance component correction value amount determination unit from the storage unit corresponding to the amount of luminance component correction value.

In the fourteenth aspect according to the present invention based on the image processor according to the twelfth aspect, the luminance component correction value amount determination unit includes a luminance component correction value amount holding unit for holding the amount of luminance component correction value that is externally set or that is received together with the frame.

In the fifteenth aspect according to the present invention based on the image processor according to the twelfth aspect, the luminance component correction value amount determination unit includes a luminance component correction value amount calculation unit for calculating the amount of luminance component correction value by analyzing one or more luminance components included in each of a plurality of frames configuring the motion picture.

BRIEF DESCRIPTION OF THE DRAWINGS

FIG. 2 is a diagram showing an example of a chrominance correction curve for chrominance correction in the image processing technique as an embodiment of the present invention;

FIG. 4 is a diagram showing an example of a chrominance correction curve in the image processing technique as an embodiment of the present invention;

FIG. 5 is a flowchart showing an example of the function of the image processing technique as an embodiment of the present invention;

FIG. 6 is a conceptual illustration of an example of the configuration of the image processing logic for realizing the image processing method as an embodiment of the present invention;

FIG. 7 is a conceptual illustration of an example of the configuration of a luminance/chrominance conversion table for use in the image processing method according to an embodiment of the present invention;

FIG. 8 is a conceptual illustration of an example of a variation of the image processing logic for realizing the image processing method as an embodiment of the present invention;

FIG. 9A is a diagram describing the function of the luminance component correction amount calculation unit in the image processing logic for realizing the image processing method as an embodiment of the present invention;

FIG. 9B is a diagram describing the function of the luminance component correction amount calculation unit in the image processing logic for realizing the image processing method as an embodiment of the present invention;

FIG. 10 is a flowchart of an example of the operation of the variation of the image processing logic exemplified in FIG. 8;

DESCRIPTION OF THE EMBODIMENTS

The embodiments of the present invention are described below in detail with reference to the attached drawings.

Figure 1A:
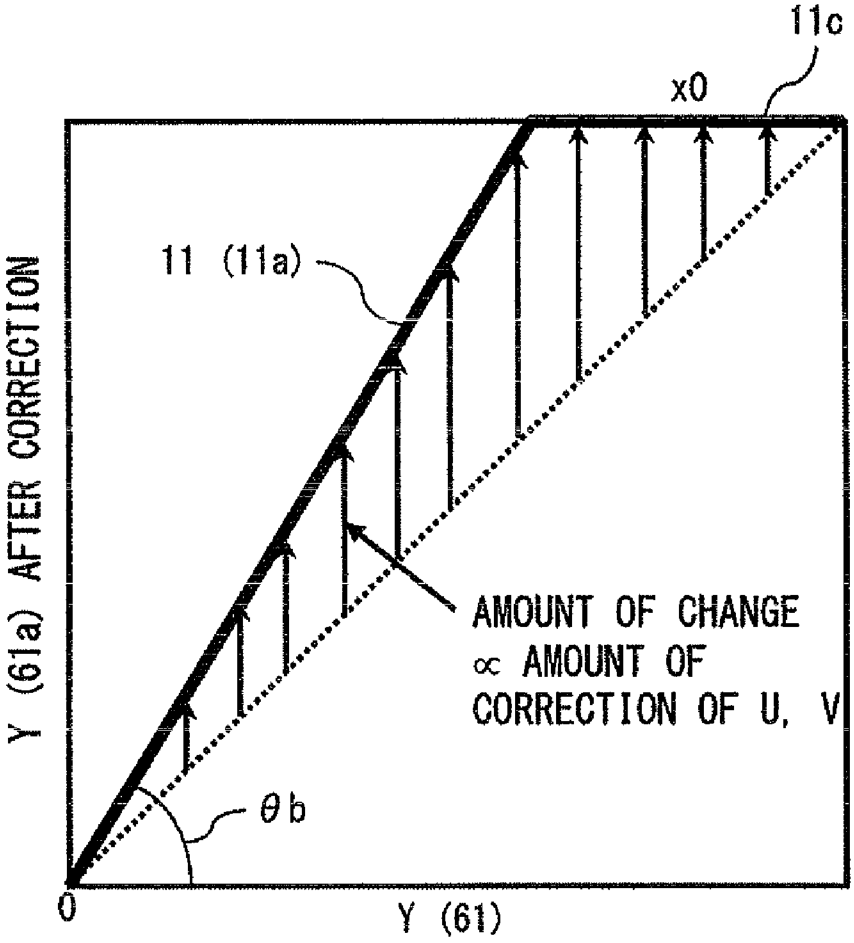
FIG. 1A is a diagram showing an example of a luminance correction curve for luminance correction in the image processing technique as an embodiment of the present invention.
Figure 1B:
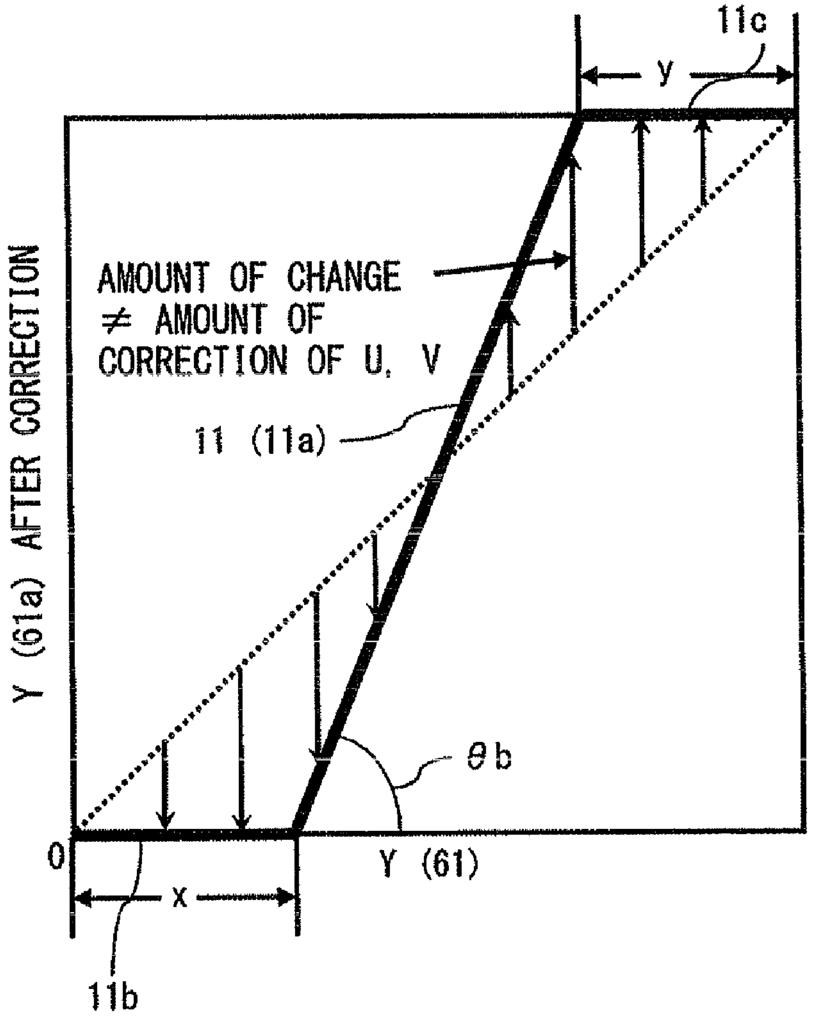
FIG. 1B is a diagram showing an example of a luminance correction curve for luminance correction in the image processing technique as an embodiment of the present invention.

FIGS. 1A and 1B are diagrams showing an example of a luminance correction curve for luminance correction in the image processing method as the present embodiment.

FIG. 2 is a diagram showing an example of a chrominance correction curve for chrominance correction in the image processing method as the present embodiment.

In the present embodiment, an amount of chrominance component correction is uniquely determined from the amount of luminance component correction, i.e., it is uniquely determined based on the amount of luminance component correction for uniquely correcting each luminance component of the entire frame of a motion picture.

That is, a parameter "a" for determining a chrominance correction curve 13 shown in FIG. 2 is determined by using, for example, a parameter "x0" for determining a luminance correction curve 11 as shown in FIG. 1A or parameters "x" and "y" for determining the luminance correction curve 11 as shown in FIG. 1B according to the present embodiment as described later.

The luminance correction curve 11 shown in FIG. 1A is used in simple luminance correction to constantly brighten all range of luminance component. The larger the parameter x0 is, the higher the corrected luminance Y becomes.

The luminance correction curve 11 shown in FIG. 1B is used for luminance correction made for clarity by enhancing contrast. The larger the parameter "x" is, the more strongly the darkness of a shadow portion is emphasized; while the larger the parameter "y" is, the more strongly the brightness of a highlighted portion is emphasized after the luminance correction.

In the present embodiment, unlike the above-mentioned conventional technology, the amount of chrominance component correction is not obtained from the amount of change of luminance component for each pixel. In the present embodiment, the amount of chrominance component correction as a whole is determined from the amount of luminance component correction as a whole, thereby realizing high-speed processing because it is not necessary to calculate an amount of correction for each pixel.

For example, assume that one frame of motion picture data is configured by 720 by 480 pixels, and 30 frames are displayed in each second (30 fps). In the case of the above-mentioned conventional technology, the amount of chrominance correction is determined for each pixel, and therefore the determination of the amount of correction should be calculated within $$1000/(30\ \text{frames}\times720\times480)\cong0.000096\ \text{ms (milliseconds) per pixel.}$$

On the other hand, the amount of chrominance component correction is determined for each frame in the present embodiment. Assume that a motion picture of, for example, 720×480 pixels×30 fps is to be processed. Then, the processing for determination can spend $$(1000\ \text{ms}/30\ \text{frames})\cong33\ \text{ms.}$$

Therefore, no dedicated hardware is required, and real-time processing by software is feasible in the present embodiment.

Since the amount of correction of a chrominance value is determined depending on the amount of change of luminance component in the above-mentioned conventional technology, the amount of chrominance correction does not depend on a chrominance value.

On the other hand, according to the present embodiment, an amount of chrominance component correction is provided by a chrominance correction curve for uniquely determining an output chrominance value for an input chrominance value. The form of a chrominance correction curve (chrominance correction curve 13 described later) for the chrominance correction is determined by the amount of luminance component correction of one frame as described later. A correction value that is output correspondingly to an actual input chrominance value is determined by a corresponding value of the chrominance correction curve depending on the input chrominance value.

In the above-mentioned conventional technology, the amount of correction of the chrominance component is determined only by the amount of luminance correction. Meanwhile, in the present embodiment, the amount of chrominance component correction is determined by a combination of an amount of luminance component correction and a chrominance value.

For example, when the width of the dynamic range of a chrominance value is −128 to 127, the chrominance correction curve 13 according to the present embodiment shown in FIG. 2 is approximated by a linear portion 13*a* and a low chrominance side saturated portion 13*b* and a high chrominance side saturated portion 13*c* on either side of the linear portion 13*a*.

The low chrominance side saturated portion 13*b* provides [a corrected chrominance value]=−128 in the range of −128≦[input chrominance value]≦(−128+a).

The linear portion 13*a* provides [a corrected chrominance value] =127×[input chrominance value]/(127−a) in the range of (−128+a)≦[input chrominance value]≦(127−a).

The high chrominance side saturated portion 13*c* provides [a corrected chrominance value]=+127 in the range of (127−a)≦[input chrominance value]≦127.

In this case, "a" refers to a parameter for control of the level (widths of the low chrominance side saturated portion 13*b* and the high chrominance side saturated portion 13*c*) of the chrominance correction. The chrominance correction curve 13 shown in FIG. 2 can be determined only by the parameter "a". For example, when the amount of luminance component correction is large, the value of the parameter "a" is controlled to increase. When the amount of luminance component correction is small, the value of "a" is controlled to decrease.

Assume that the luminance correction similarly indicates a luminance correction curve for uniquely determining an output luminance value for an input luminance value as the chrominance correction. When the luminance correction curve can be generated by one or more parameters, the parameter "a" of the chrominance correction curve can be determined depending on the one or more parameters for determination of the luminance correction curve.

Figure 3:
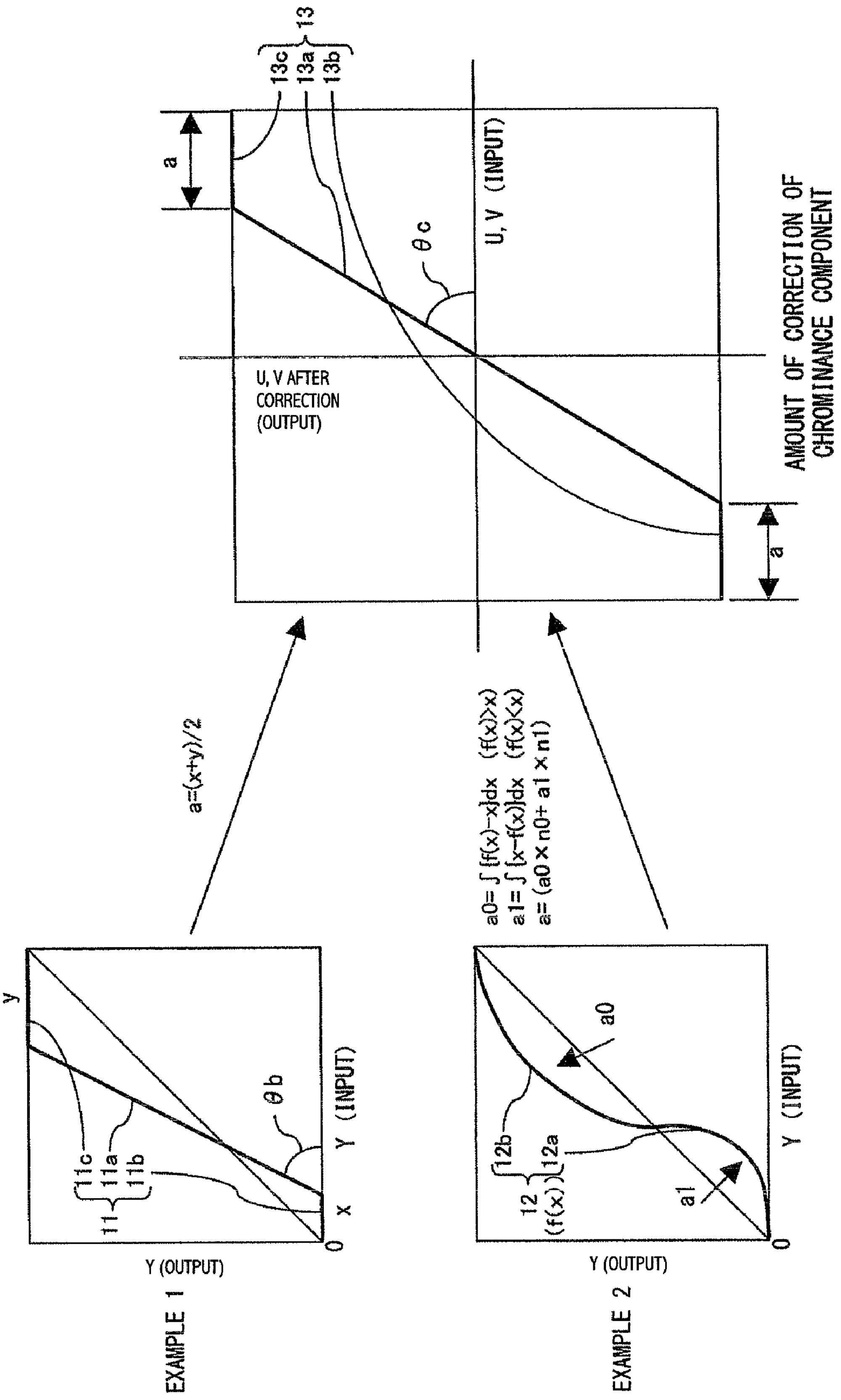
FIG. 3 is a conceptual illustration of an example of a method of determining a chrominance correction curve in the image processing technique as an embodiment of the present invention.

FIG. 3 is a conceptual illustration of an example of a method of determining a chrominance correction curve from a luminance correction curve in the present embodiment.

The luminance correction curve 11 of the example 1 and a luminance correction curve 12 of the example 2 are correction curves for correction of the dynamic range for enhancing contrast and clarity of an image.

Relating to the correction curve for correction of the dynamic range, refer to the document such as the "Computer Image Processing", pp. 101-104 edited by Hideyuki Tamura published by Ohmsha on Dec. 20, 2002.

The luminance correction curve 12 of the example 2 is a luminance correction curve that especially enables to prevent blocked-up shadows or "black-out" in a shadow portion 12*a* (i.e., area of a low luminance value) and burned-out highlights or "white-out" in a highlighted portion 12*b* (area of a high luminance value).

In the case of the example 1, the luminance correction curve 11 can be represented by the value "x" of a shadow portion 11*b* and the value "y" of a highlighted portion 11*c*. In this case, the parameter "a" (which indicates widths of the low chrominance side saturated portion 13*b* and the high chrominance side saturated portion 13*c*) of the chrominance correction curve 13 can be calculated by $$a=(x+y)/2 \quad \text{(equation 1)}$$

When the importance levels of the shadow portion 11*b* and the highlighted portion 11*c* of the luminance correction curve 11 are to be discriminated, for example, weight coefficients can be additionally used as follows.

$$a=(0.3x+0.7y) \quad \text{(equation 2)}$$

In the case of the luminance correction curve 12 of the example 2, the parameter "a" (which indicates widths of the low chrominance side saturated portion 13*b* and the high chrominance side saturated portion 13*c*) of the chrominance correction curve 13 can be calculated from the levels of the amount of correction "a0" used for brightening the highlighted portion 12*b* and the amount of correction "a1" used for darkening the shadow portion 12*a*.

Practically, the highlighted side accumulation value "a0" and the shadow side accumulation value "a1" are obtained respectively as integrated values. The former value "a0" is integrated as the area between the straight line indicating non-correction and the highlighted portion 12*b*; and the latter value "al" is integrated as the area between the straight line indicating non-correction and the shadow portion 12*a*.

That is, in the case of the luminance correction curve 12 of the example 2 shown in FIG. 3, and in the coordinate space defined by the axis "x" of abscissas (indicating input luminance Y) and the axis of ordinates indicating the corrected luminance Y, assume that the luminance correction curve 12 is provided by Y=f(x). In this coordinate space, when the luminance is not corrected, Y=x (represented by the aforementioned straight line) is held.

The area of the region (where f(x)>x holds), i.e., the area of the region where the curve of f (x) is positioned above the straight line indicating no-correction indicates the highlighted side accumulation value "a0", and obtained by $$a0=\int\{f(x)-x\}dx \quad \text{(equation 3)}$$

Similarly, the area of the region (where f (x)<x holds), i.e., the area of the region where the curve off (x) is positioned below the straight line indicating no-correction indicates the shadow side accumulation value "a1", and obtained by $$a1=\int\{x-f(x)\}dx \quad \text{(equation 4)}$$

Then, the obtained "a0" and "a1" are multiplied respectively by the weight coefficients "n0" and "n1" of the highlighted portion 12*b* and the shadow portion 12*a* as follows.

$$a=a0\times n0+a1\times n1 \quad \text{(equation 5)}$$

When the correction of luminance is performed by the luminance correction curve 11 or 12 of the example 1 or 2, according to the above-mentioned conventional technology, the chrominance is corrected to enhance the vividness in the region of "a0" (i.e., in pixels corrected for higher luminance), but the chrominance is corrected to represent lower saturation in the region of "a1" (i.e., in pixels corrected for lower luminance). A dark region in an original image becomes lower in both luminance and chrominance. At the point where partial curves respectively corresponding to "a0" and "a1" connect, the amount of luminance component correction=0 and no correction is made in chrominance.

That is, in the above-mentioned conventional technology, there are a region in which the chrominance is corrected for higher vividness, a region in which the chrominance is corrected for lower saturation, and a region in which the chrominance is not corrected, which are mixed in an image, thereby generating an unbalanced image.

On the other hand, in the present embodiment as exemplified in FIG. 4, all chrominance except that for achromatic colors (indicated by the center of the chrominance correction curve 13) and that for colors of the highest saturation (both ends of the chrominance correction curve 13) is corrected for higher vividness.

Since the achromatic color has originally no saturation and no chrominance component, no correction is required (if any color is applied to white or gray by correction, it results in an unnatural image). The highest saturation portions correspond to the upper limit of the saturation, and therefore, no further correction can be performed. Accordingly, it is not necessary to correct the chrominance in these two regions (i.e., low chrominance side saturated portion 13*b* and high chrominance side saturated portion 13*c*).

Other portion, i.e., linear portion 13*a* indicates the straight line passing the center point indicating achromatic colors (where amount of correction=0). Therefore, unnatural images of colored white or gray portions are not generated, and a corrected image with the entire image corrected for higher vividness can be obtained by converting an input chrominance value (before correction) into an output chrominance value (after correction) depending on the slope of the linear portion 13*a*.

Therefore, unlike the conventional technology, there is no possibility of degraded image quality due to mixture of a corrected region for higher saturation and vividness, a corrected region for lower saturation, and a region without saturation correction (i.e., without chrominance correction).

FIG. 5 is a flowchart showing an example of a function of the image processing method of the present embodiment.

First, one frame of the motion picture data is taken (step 101), and the amount of luminance component correction on the entire frame is held (step 102). In this case, as the amount of luminance component correction to be held, for example, what is related to the frame as a part of the image data, and the amount of luminance component correction that is set externally, are available.

Next, using the technology according to the present embodiment illustrated in FIG. 3 etc., the amount of chrominance component correction (i.e., chrominance correction curve 13) is determined from the amount of luminance component correction (i.e., luminance correction curve 11 or luminance correction curve 12) relating to the frame (step 103).

Then, the chrominance value is corrected by the amount of chrominance component correction determined in step 103 relating to each chrominance component of all pixels in the frame (steps 104 and 105).

Concurrently with this process, the luminance of each pixel in the frame is also corrected by using the luminance correction curve 11 or the luminance correction curve 12.

The processes in steps 101 through 105 are repeated on all frames sequentially received as motion picture data (step 106).

In the case of the present embodiment, the amount of correction of the luminance component is given by a luminance correction curve (for example, the luminance correction curve 11, the luminance correction curve 12, etc.) for uniquely determining an output luminance value for an input luminance value, and the amount of luminance component correction held in step 102 is one or more parameters for determining a luminance correction curve.

The one or more parameters for determining the luminance correction curve can be, for example, the values "x", "y", etc. of the shadow portion 11*b* and the highlighted portion 11*c* shown in the luminance correction curve 11 in FIG. 3. Since only two values need to be held (for example, only a 2-byte memory area is needed for holding the values) as the amount of luminance component correction functioning as the one or more parameters, the size of the holding unit can be remarkably reduced.

On the other hand, the amount of chrominance component correction in step 103 above is a chrominance correction curve (in the case of the present embodiment, the chrominance correction curve 13 shown in FIG. 3) for uniquely determining the output chrominance value for the input chrominance value. This uniqueness is similar to that of the luminance correction curve. The parameter "a" for determining the chrominance correction curve is calculated from the amount of luminance component correction (for example, the above-mentioned "x" and "y").

As a method of determining the parameter "a", for example, the (equation 1) above can be used, or the chrominance correction curve 13 can be determined by the (equation 5) above using the weight coefficients "n0" and "n1" for applying a bias to the shadow portion and the highlighted portion.

Furthermore, in step 103, as a method of obtaining an amount of chrominance component correction from an amount of luminance component correction, a two-dimensional lookup table (2D-LUT) for uniquely obtaining the value "a" for a combination of the values "x" and "y" can be used instead of calculation.

In the description above, the parameter "a" of the chrominance correction curve 13 is the value (the value indicating the range of the low chrominance side saturated portion 13*b* and the high chrominance side saturated portion 13*c*) indicating the range in which a correction is made for the maximum value regardless of an input chrominance value; but it can be replaced by the slope angle θc of the linear portion 13*a* of the chrominance correction curve 13.

When the slope tan(θc)=1, no correction is made. As tan (θc) grows, the chrominance correction is intensified.

When the luminance correction curve 11 is similarly represented by the slope angle θb, the slope angle θc of the chrominance correction curve 13 can be proportional to the slope angle θb of the luminance correction curve 11, and the chrominance correction curve 13 can be easily calculated by $$\theta c = n \times \theta b \quad \text{(equation 6)}$$

where "n" is a coefficient.

When the luminance correction curve is a little complicated curve such as the luminance correction curve 11 and the luminance correction curve 12 shown in FIG. 3, the value θc can be determined depending on the integration value of the difference between the actual luminance correction curve and an assumed luminance correction curve (i.e., a straight line of the slope tan(θb)=1) without correction.

Thus, in the case of the present embodiment, the amount of chrominance component correction for the entirety of one frame is determined depending on the amount of luminance component correction for the entirety of the one frame, and the respective chrominance values of the entire pixels in the frame are corrected by using the amount of chrominance component correction.

Therefore, the quality of an image can be improved by chrominance correction depending on the luminance correction without requiring dedicated hardware etc. because a required processing load is so small that the processing by, for example, software is feasible.

In addition, an unnatural image including both a region of enhanced saturation and a region of reduced saturation in a mixed manner can be avoided. Thus, the chrominance correction depending on the luminance correction can be realized without generating an unnatural image.

Next, an example of the image processing logic and the image processor for realizing the image processing method according to the present embodiment is described below.

FIG. 6 is a conceptual illustration showing an example of the configuration of the image processing logic according to the present embodiment.

The image processing logic G according to the present embodiment can be realized by, for example, software.

The image processing logic G according to the present embodiment includes, for example, a component division unit 20, a luminance component correction amount holding unit 21, a luminance correction unit 22, a chrominance component correction amount determination unit 23, and a chrominance correction unit 24.

The component division unit 20 separates and extracts a luminance component 61 and a chrominance component 62 from each frame of motion picture data 60 externally input.

The luminance component correction amount holding unit 21 stores an amount of luminance component correction such as an amount of luminance component correction accompanying the motion picture data 60.

The luminance correction unit 22 corrects the luminance component 61 using the luminance correction curve 11 or the luminance correction curve 12 shown in FIG. 3 and determined based on the amount of luminance component correction, and outputs the result as a corrected luminance component 61*a* to a later stage.

The chrominance component correction amount determination unit 23 determines an amount of chrominance component correction from the amount of luminance component correction held in the luminance component correction amount holding unit 21 before the correction is executed.

Practically, the amount of luminance component correction is one or more parameters representing the luminance correction curve 11 shown in FIGS. 1A or 1B. The amount of chrominance component correction determined by the chrominance component correction amount determination unit 23 is, for example, the chrominance correction curve 13 shown in FIG. 2, and the parameter "a" of the chrominance correction curve 13 is obtained in the calculation by $$a = x0,\ a = (x+y)/2, \text{ etc.}$$

using one or more of the parameters "x0", "x", and "y" of the luminance correction curve.

Alternatively, the image processing logic G can be configured in such a way that a one-dimensional lookup table (LUT) for uniquely obtaining "a" for "x0" or a two-dimensional lookup table (LUT) for uniquely obtaining "a" for a combination of "x" and "y" is held for access from the chrominance correction unit 24.

When the amount of luminance component correction is provided in a form of the one-dimensional lookup table (LUT) that represents the luminance correction curve itself, the parameter of the chrominance correction curve 13 can be determined by another one-dimensional lookup table (LUT) in which the value of the parameter "a" is uniquely determined depending on the area (i.e., integration value) between the straight line indicating no-correction and the luminance correction curve; where the straight line passes the point where the luminance Y is 0 and the straight line has the slope of 1.

FIG. 7 shows an example of the configuration a luminance/chrominance conversion table 30 as an example of the one-dimensional lookup table (LUT).

The luminance/chrominance conversion table 30 is provided in the chrominance component correction amount determination unit 23. In the luminance/chrominance conversion table 30, a discrete luminance integration value 31 in the luminance correction curve 11 and the corresponding value of the parameter "a" of the chrominance correction curve 13 are associated with each other and stored.

The chrominance component correction amount determination unit 23 retrieves, for each frame, a corresponding chrominance parameter value 32 (i.e., the value of the parameter "a") by searching the luminance integration value 31 of the luminance/chrominance conversion table 30 by using the amount of luminance component correction obtained from the luminance component correction amount holding unit 21 as a key. Based on the parameter "a", the chrominance correction curve 13 is determined by the chrominance component correction amount determination unit 23.

The chrominance correction unit 24 inputs the chrominance component 62 before correction to the chrominance component correction amount determination unit 23, receives a chrominance correction value determined by the chrominance component correction amount determination unit 23 using the chrominance correction curve 13, and performs a process of correcting the chrominance component 62 to a corrected chrominance component 62*a*.

As described above, after the chrominance correction curve 13 is determined based on the luminance correction curve 11 in the image processing logic G, the following processes are performed for each frame of the motion picture data 60: the component division unit 20 divides a frame image into the luminance component 61 and the chrominance component 62; the luminance component 61 is corrected by the luminance correction unit 22 and the chrominance component 62 is corrected by the chrominance correction unit 24; and the results are respectively output to a processing unit in the later stage not shown in the attached drawings as a corrected luminance component 61*a* and a corrected chrominance component 62*a*.

In the image processing logic G exemplified in FIG. 6 described above, a particular value predetermined as a amount of luminance component correction is applied to the entire motion picture data 60 (thus, such a manner is herein called as static luminance correction). In contrast, the amount of luminance component correction can be dynamically determined depending on each frame included in the motion picture data 60 (such a manner is herein called as dynamic luminance correction).

FIG. 8 is a block diagram of an image processing logic G1 as a variation of the image processing logic G according to the present embodiment.

In the image processing logic G1 as a variation of the present embodiment, the luminance component correction amount holding unit 21 of the image processing logic G is replaced with a luminance component correction amount calculation unit 21A.

The luminance component correction amount calculation unit 21A determines, for each frame of the motion picture data 60, the amount of luminance component correction on the basis of the information about the luminance component in an actual frame currently concerned before the correcting process of the currently concerned frame is executed.

In the image processing logic G1 according to the variation, there is no frame buffer for temporarily storing each frame of the motion picture data 60. Therefore, processing is performed without luminance component correction in the first frame, and also without chrominance component correction in the first frame.

As exemplified in FIGS. 9A and 9B, a histogram 10 of the luminance value of the luminance component is obtained in the first frame, and the luminance correction curve 11 is determined based on the result.

That is, the luminance correction curve 11 is determined from the histogram 10 by setting a luminance value 10*a* at which the histogram 10 starts occurrences on the shadow side as an "x" value of the luminance correction curve 11 (FIG. 9B) and setting a luminance value 10*b* at which the histogram 10 terminates on the highlight side as a "y" value of the luminance correction curve 11; where the histogram 10 indicates the distribution of the frequency for each of the luminance values of (1) all pixels in an image sampled by segmenting a rectangle part within the first frame, or (2) the entire pixels in the first frame.

Thus, according to the information about the luminance in the actual motion picture data 60, a clarified image with enhanced contrast using the total range width of the luminance can be generated.

Thus, in the image processing logic G1, the luminance correction curve 11 is determined from the histogram 10 for each frame, and then the chrominance correction curve 13 (shown in FIG. 2) is determined for each luminance correction curve 11. The operation after determining the chrominance correction curve 13 is the same as the operation in the image processing logic G exemplified in FIG. 6 above.

In the image processing logic G1 according to the present variation, the first frame is not corrected in luminance nor in chrominance, but in the second frame, an image corrected by the amount of luminance component correction (represented by the luminance correction curve 11) and the amount of chrominance component correction (represented by the chrominance correction curve 13), both calculated on the basis of the luminance values of the first frame immediately before the current second frame, can be obtained.

In the above manner, the amount of correction of luminance and chrominance is one frame delayed. However, by being equipped with a frame buffer and holding one frame in the frame buffer, the first frame can be corrected by the amount of correction derived from the first frame without delay. However, in case of motion pictures, the fluctuation in time direction is very low. Therefore, it is considered that, in many cases, a time delay of one frame can be allowed rather than a large-scaled circuit that is provided with a frame buffer.

FIG. 10 is a flowchart of an example of the operation of the image processing logic G1 according to the present variation embodiment.

One frame is input from the motion picture data 60 (step 201), and the histogram 10 (FIG. 9A) is generated from a part or all of the pixels in the frame (step 202).

Next, the luminance correction curve 11 (FIG. 9B) is determined from the histogram 10 (step 203), and the chrominance correction curve 13 (FIG. 2) is determined from the luminance correction curve 11 (step 204).

Then, each pixel in the frame is input (step 205), and the process of correcting the chrominance component using the chrominance correction curve 13 (step 206) is repeated on all pixels (step 207).

Concurrently with the processes in steps 205 through 207, the luminance is corrected using the luminance correction curve 11 applied to the entirety of the frame.

Furthermore, the processes in steps 201 through 207 are repeated on all frames of the motion picture data 60.

Figure 11:
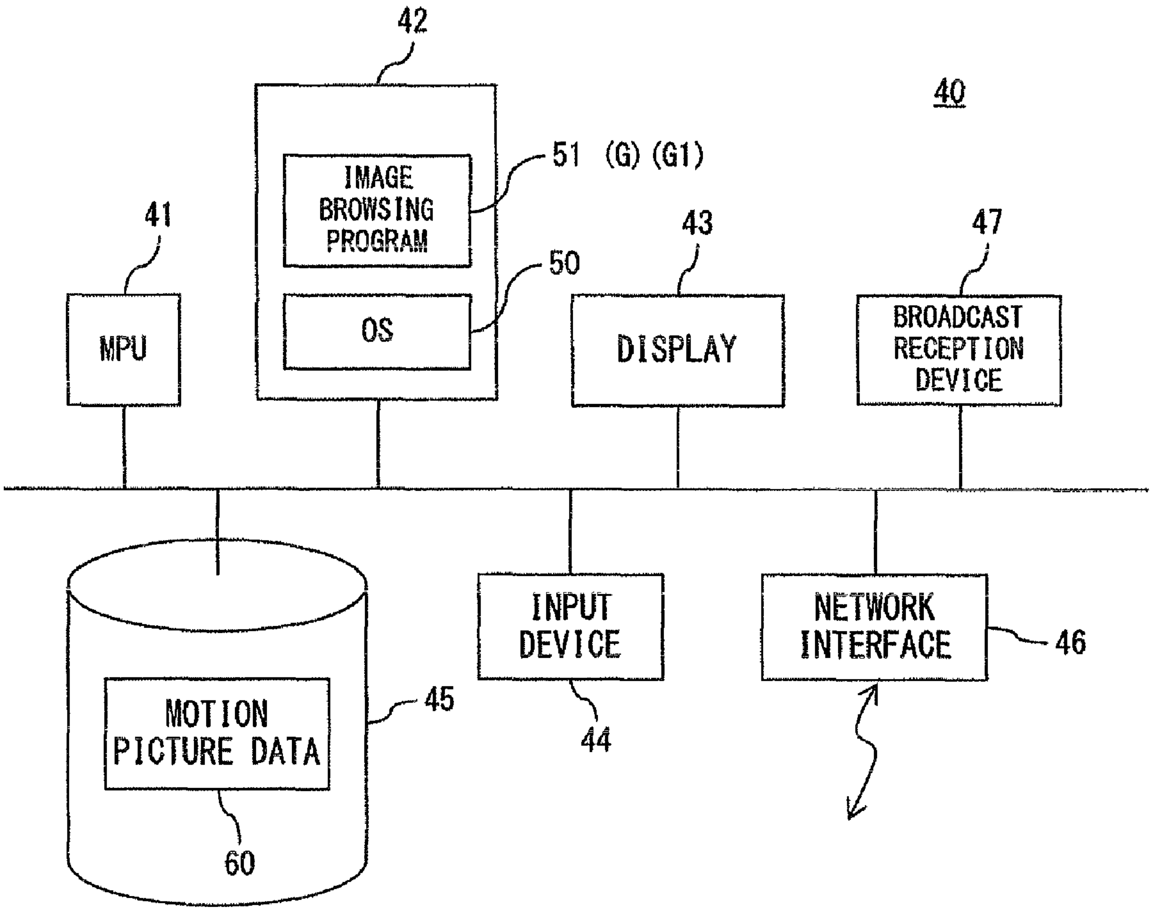
FIG. 11 is a conceptual illustration of an example of the configuration of the image processor for embodying an image processing method as an embodiment of the present invention.

FIG. 11 is a conceptual illustration showing an example of the configuration of an image processor implementing the image processing method according to an embodiment of the present invention.

An image processor 40 according to the present embodiment is a computer which includes, for example, an MPU (microprocessor unit) 41, main storage 42, a display 43, an input device 44, an external storage device 45, and a network interface 46.

The MPU 41 controls the entire image processor 40 by executing the program stored in the main storage 42.

In the case of the present embodiment, the main storage 42 is provided with an operating system 50 and an image browsing program 51.

The display 43 displays information such as image data etc. The display 43 is provided with a sound input/output function.

The input device 44 is configured by a keyboard, a mouse, etc., and used in inputting information by a user.

The external storage device 45 stores the motion picture data 60 browsed by the image browsing program 51.

The image processor 40 can include a broadcast reception device 47 for receiving a television broadcast etc. as necessary.

In this case, the motion picture data 60 can include a broadcast image received through the broadcast reception device 47.

Otherwise, the broadcast received through the broadcast reception device 47 can be displayed on the display 43 by the image browsing program 51 to allow a user to browse.

The motion picture data 60 can be motion picture data received externally through the network interface 46.

A user can browse the motion picture data 60 by the MPU 41 executing the operating system 50 and the image browsing program 51.

In the case of the present embodiment, the image browsing program 51 includes a program to implement the image processing logic G or the image processing logic G1 described above.

When the motion picture data 60 is displayed on the display 43, luminance correction is performed for each frame, and each individual pixel in the frame is chrominance-corrected depending on the luminance correction.

The image processing logic G and the image processing logic G0 implemented by the image browsing program 51 according to the present embodiment have a small processing load as described above, and are appropriate for software processing.

Therefore, the luminance and chrominance of a displayed image, which is an image of the motion picture data 60 displayed on the display 43, can be appropriately adjusted and a high-quality motion picture can be browsed by a user at a low cost without adding hardware for special image processing to the image processor 40.

The image browsing program 51 according to the present embodiment can allow a user to participate the process of determining the chrominance correction curve 13 from the luminance correction curve 11 or the luminance correction curve 12 as exemplified in FIG. 3 above.

Figure 12:
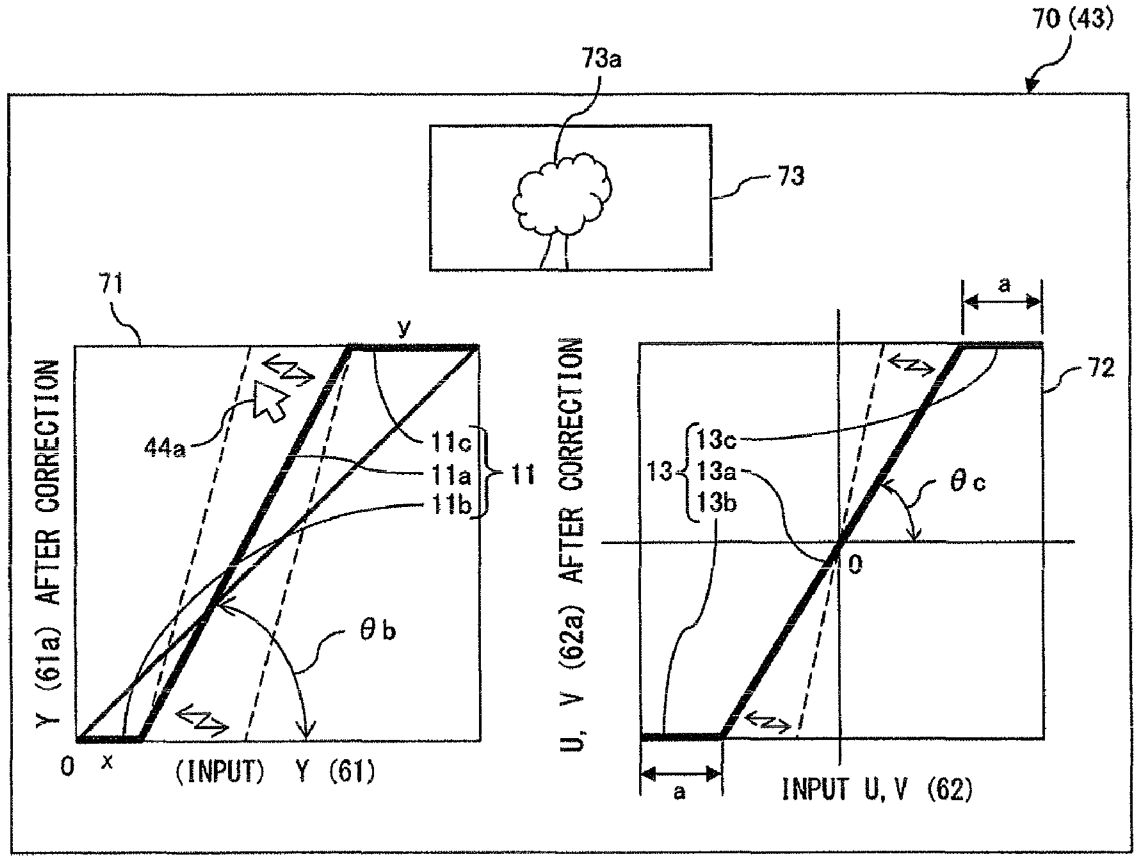
FIG. 12 is an explanatory view showing an example of the display screen of the image processor for embodying an image processing method as an embodiment of the present invention.

The example is described below with reference to FIG. 12. A luminance/chrominance setting screen 70 exemplified in FIG. 12 includes a luminance correction curve setting window 71, a chrominance correction curve display window 72, and a sample image window 73.

The luminance correction curve setting window 71 displays the luminance correction curve 11 including a linear portion 11*a*, the shadow portion 11*b*, and the highlighted portion 11*c*, and a mouse pointer 44*a*.

The chrominance correction curve display window 72 displays the chrominance correction curve 13 dependently linked to the luminance correction curve 11 in the luminance correction curve setting window 71.

The user operates the mouse pointer 44*a* through the input device 44, and optionally sets the width (y) of the highlighted portion 11*c*, in other words, the slope angle θb of the linear portion 11*a*, by positioning the mouse pointer 44*a* in the vicinity of the intersection of the linear portion 11*a* and the highlighted portion 11*c* followed by dragging the mouse pointer 44*a* right and left.

Similarly, the user optionally sets the width (x) of the shadow portion 11*b*, in other word, the slope angle θb of the linear portion 11*a*, by positioning the mouse pointer 44*a* in the vicinity of the intersection of the linear portion 11*a* and the shadow portion 11*b* followed by dragging the mouse pointer 44*a* right and left.

The luminance correction result by the luminance correction curve 11 that is set in the above manner is reflected in real time on a sample image 73*a* of the sample image window 73. The user adjusts the form of the luminance correction curve 11 as described above while watching the sample image 73*a*, thereby optionally performing the luminance correction.

At this time, according to the present embodiment, the width (parameter "a") of the low chrominance side saturated portion 13*b* and the high chrominance side saturated portion 13*c* of the chrominance correction curve 13 in the chrominance correction curve display window 72 changes according to the algorithm of associating the luminance correction curve 11 with the chrominance correction curve 13 as described above with reference to FIG. 3.

Then, the chrominance correction result depending on the change in form of the chrominance correction curve 13 is also reflected on the sample image 73*a* of the sample image window 73 in real time.

The setting results of the luminance correction curve 11 and the chrominance correction curve 13 are respectively set in the luminance component correction amount holding unit 21 and the chrominance component correction amount determination unit 23 of the image processing logic G implemented by the image browsing program 51.

Thus, the user can set the luminance correction curve 11 and the chrominance correction curve 13 corresponding to the luminance correction curve 11 with high operability while observing the change of the sample image 73*a* of the sample image window 73.

Then, by browsing the motion picture data 60 using the image browsing program 51 with the settings set in the above manner, the motion picture whose luminance and chrominance have been appropriately corrected can be browsed on the display 43.

As described above, according to the present embodiment, the amount of chrominance component correction applied to each pixel of one frame is uniquely determined based on the amount of luminance component correction applied to the entirety of the one frame. Therefore, first, it is not necessary to calculate the amount of correction of a chrominance signal for each pixel, and the amount of correction can be calculated for each frame (i.e., only calculation of the amount of correction applicable to the entirety of one frame is needed), thereby making a real-time process by software feasible. Second, the present embodiment is applicable to not only the simple brightness correction in one direction by the adjustment of the highlighted portion 11*c* (represented by the parameter "x0") as shown in FIG. 1A, but also bi-directional luminance component correction such as dynamic range correction for changing both shadow portion 11*b* (represented by the parameter "x") and highlighted portion 11*c* (represented by the parameter "y") as shown in FIG. 1B, therefore realizing an effect that has not been realized by conventional technology.

The present invention is not limited to the above-mentioned embodiment with the exemplified configuration, but can be applied to various cases within the gist of the invention.

According to the embodiment of the present invention, the quality of an image can be improved by performing the chrominance correction depending on the luminance correction with a small processing load without requiring dedicated hardware etc.

In addition, the chrominance correction can be realized depending on the luminance correction without generating an unnatural image.

What is claimed is:

1. A computer-readable storage medium storing an image processing program used to direct a computer to perform image processing, the image processing comprising:

obtaining first definition information defining a luminance component correction curve to be applied to a luminance component of each of all pixels in a frame forming a motion picture;

determining second definition information defining a chrominance component correction curve which is to be applied to a chrominance component of each of the pixels in the frame and which is represented by a function which takes the chrominance component as an only argument, wherein the second definition information is determined from the first definition information;

correcting the luminance component of each of the pixels in the frame by the luminance component correction curve; and correcting the chrominance component of each of the pixels in the frame by the same chrominance component correction curve.

2. The computer-readable storage medium according to claim 1, wherein in the determining, the second definition information is determined by reading the second definition information corresponding to the first definition information from a storage unit where the first definition information and the second definition information are stored and associated with each other.

3. The computer-readable storage medium according to claim 1, wherein in obtaining, the first definition information is obtained from an externally set amount or an accompanying amount received together with the frame.

4. The computer-readable storage medium according to claim 1, wherein in the obtaining, one or more luminance components included in each of a plurality of frames configuring the motion picture are analyzed to obtain the first definition information.

5. An image processing method, comprising:

obtaining first definition information defining a luminance component correction curve to be applied to a luminance component of each of all pixels in a frame forming a motion picture;

determining second definition information defining a chrominance component correction curve which is to be applied to a chrominance component of each of the pixels in the frame and which is represented by a function which takes the chrominance component as an only argument, wherein the second definition information is determined from the first definition information;

correcting the luminance component of each of the pixels in the frame by the luminance component correction curve; and correcting the chrominance component of each of the pixels in the frame by the same chrominance component correction curve.

6. The image processing method according to claim 5, wherein the luminance component correction curve takes only a single argument that is the luminance component; and the first definition information includes one or more first values for defining the luminance component correction curve.

7. The image processing method according to claim 5, wherein the second definition information includes one or more second values for defining the chrominance component correction curve.

8. The image processing method according to claim 5, wherein the luminance component correction curve takes only a single argument that is the luminance component;

the first definition information includes one or more first values for defining the luminance component correction curve;

the second definition information includes one or more second values for defining the chrominance component correction curve; and the one or more second values are determined from the one or more first values.

9. The image processing method according to claim 5, wherein the luminance component correction curve takes only a single argument that is the luminance component; and the first definition information is a gradient value of the luminance component correction curve.

10. The image processing method according to claim 5, wherein the second definition information is a gradient value of the chrominance component correction curve.

11. The image processing method according to claim 5, wherein the luminance component correction curve takes only a single argument that is the luminance component;

the first definition information includes one or more first values for defining the luminance component correction curve;

the second definition information includes one or more second values for defining the chrominance component correction curve; and at least one of the one or more second values is determined depending on accumulation of differences between the luminance component correction curve and another curve indicating a case where luminance correction is not performed.

12. An image processor, comprising:

a component division unit that divides each frame of a motion picture into a luminance component and a chrominance component;

an obtaining unit that obtains first definition information defining a luminance component correction curve to be applied to the luminance component of each of all pixels in a frame currently concerned for correcting the luminance component;

a luminance component correction unit that corrects the luminance component of each of the pixels in the frame divided by the component division unit by the luminance component correction curve;

a determination unit that determines second definition information defining a chrominance component correction curve which is to be applied to the chrominance component of each of the pixels in the frame and which is represented by a function which takes the chrominance component as an only argument, wherein the determination unit determines the second definition information from the first definition information; and a chrominance component correction unit that corrects the chrominance component of each of the pixels in the frame divided by the component division unit by the same chrominance component correction curve.

13. The image processor according to claim 12, wherein the determination unit includes a storage unit where the first definition information and the second definition information are stored and associated with each other; and the chrominance component correction unit corrects the chrominance component of each of the pixels configuring the frame using the same chrominance component correction curve defined by the second definition information read by the determination unit from the storage unit corresponding to the first definition information.

14. The image processor according to claim 12, wherein the obtaining unit includes a holding unit that holds, as the first definition information, a value that is externally set or that is received together with the frame.

15. The image processor according to claim 12, wherein the obtaining unit includes a calculation unit that calculates the first definition information by analyzing one or more luminance components included in each of a plurality of frames configuring the motion picture.

* * * * *

UNITED STATES PATENT AND TRADEMARK OFFICE

CERTIFICATE OF CORRECTION

PATENT NO. : 8,330,869 B2
APPLICATION NO. : 12/139796
DATED : December 11, 2012
INVENTOR(S) : Kimitaka Murashita et al.

It is certified that error appears in the above-identified patent and that said Letters Patent is hereby corrected as shown below:

Column 17, Line 6, In Claim 3, delete “in” and insert -- in the --, therefor.

Signed and Sealed this
Second Day of April, 2013

Teresa Stanek Rea
*Acting Director of the United States Patent and Trademark Office*